United States Patent [19]
Pike

[11] 3,785,630
[45] Jan. 15, 1974

[54] GAS COLLECTOR FOR STEEL FURNACE
[75] Inventor: Daniel E. Pike, Harrington Park, N.J.
[73] Assignee: Air Pollution Industries, Inc., Englewood, N.J.
[22] Filed: Sept. 18, 1972
[21] Appl. No.: 289,817

Related U.S. Application Data
[62] Division of Ser. No. 80,332, Oct. 13, 1970, Pat. No. 3,707,069.

[52] U.S. Cl. .................................. 266/16, 266/35
[51] Int. Cl. ............................................. C21c 5/40
[58] Field of Search ................. 75/60; 266/35, 15, 266/16, 19, 36

[56] References Cited
UNITED STATES PATENTS
| | | | |
|---|---|---|---|
| 3,154,406 | 10/1964 | Allard | 75/60 |
| 1,417,588 | 5/1922 | Van Amburgh | 266/36 P |
| 3,271,130 | 9/1966 | Denig | 75/60 |
| 3,456,928 | 7/1969 | Selway | 75/60 |

Primary Examiner—Gerald A. Dost
Attorney—Jack Schuman

[57] ABSTRACT

Water-cooled, panel-constructed tapered hood over mouth of steel furnace leads to water-cooled, panel-constructed stack having approximately parabolic vertical cross-section to increase velocity and velocity pressure of off-gas and to reduce static pressure of off-gas and maintain such static pressure at a negative value throughout stack. Off-gas will not leak out between panel joints. Same effect may be achieved by inserting orifice plate in bottom of conventional stack. Inner wall of hood and stack lined with ceramic to reduce cooling water requirement, only enough cooling water being required to prevent ceramic from melting, cooling of off-gases more economically being handled in gas cleaning system.

2 Claims, 4 Drawing Figures

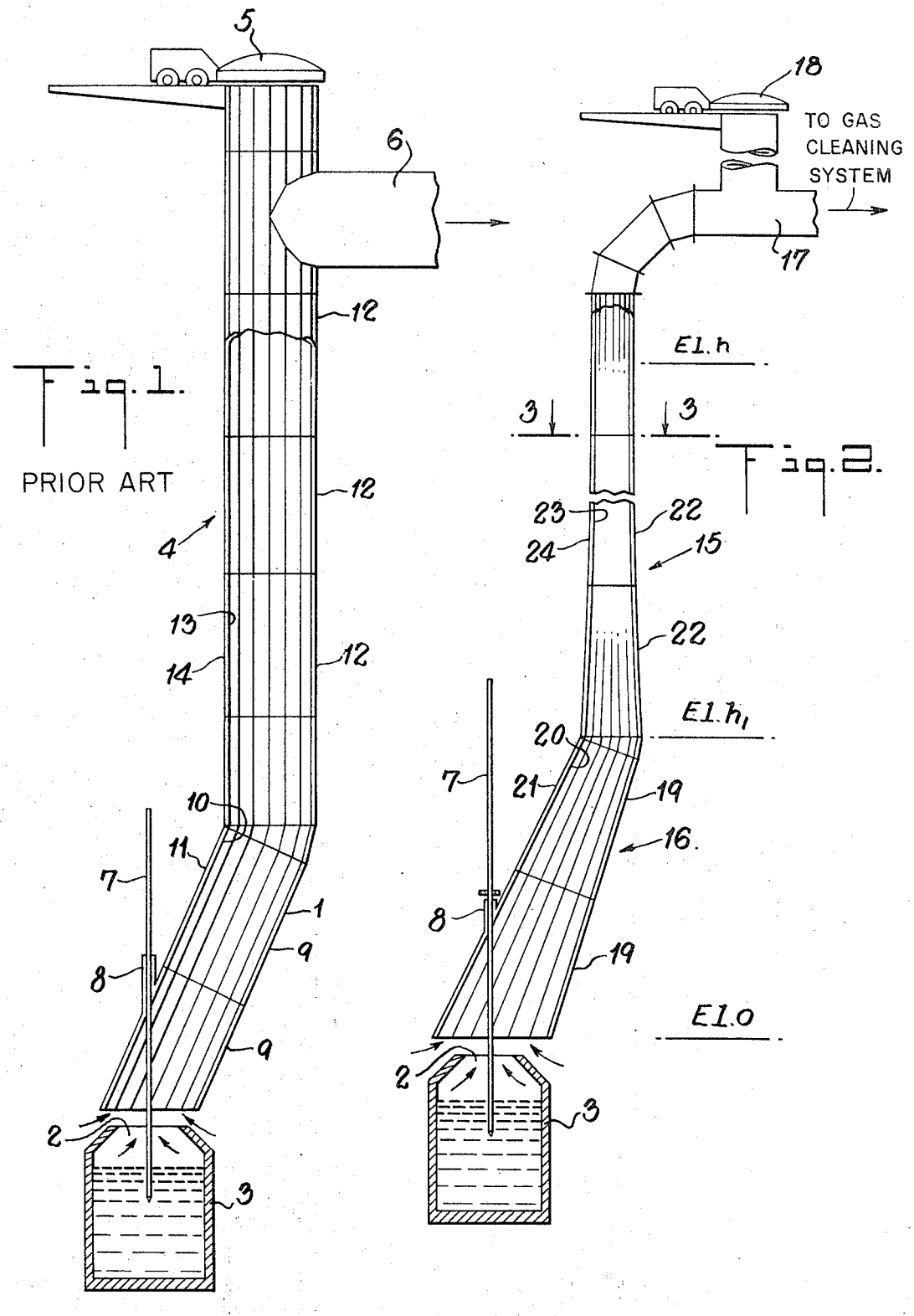

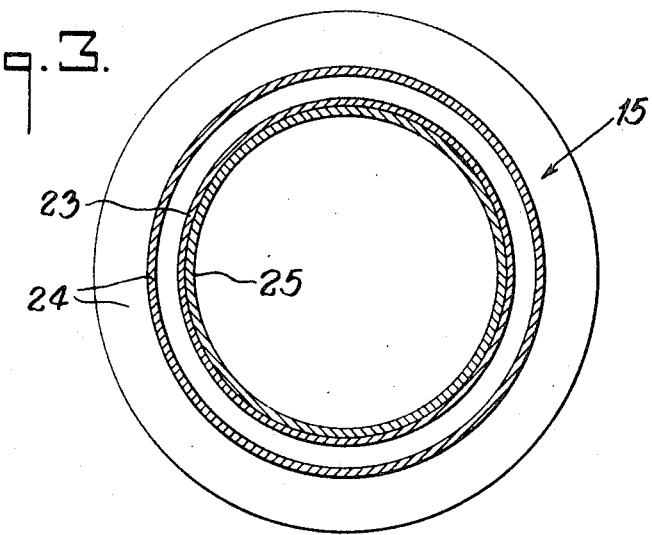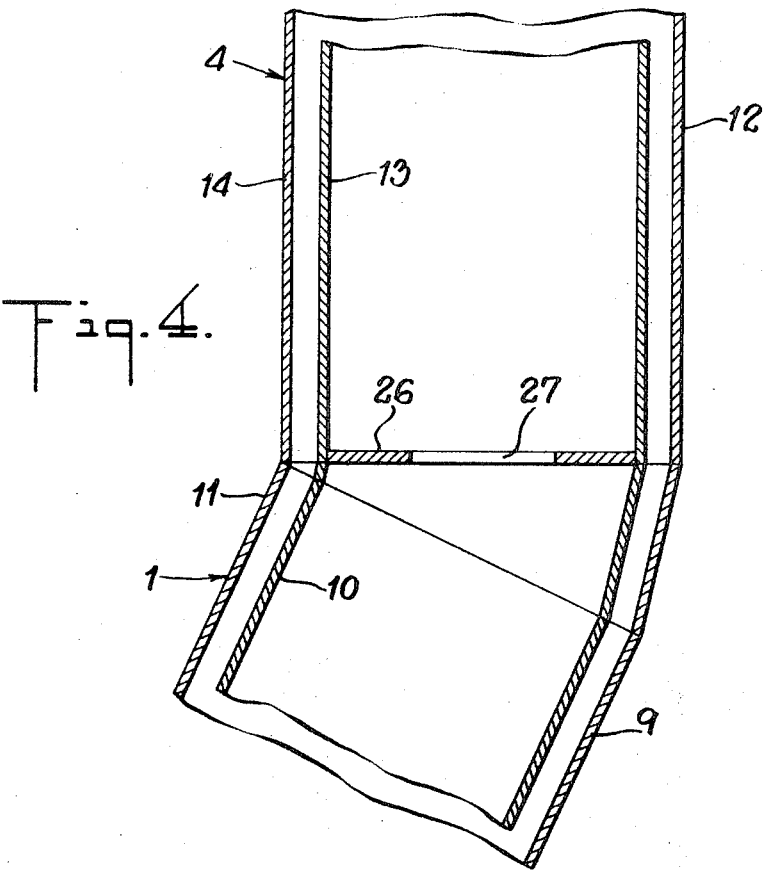

GAS COLLECTOR FOR STEEL FURNACE

CROSS-REFERENCE TO RELATED APPLICATION

This application is a division of application Ser. No. 80,332, filed Oct. 13, 1970, now U.S. Pat. No. 3,707,069.

BACKGROUND OF THE INVENTION

1. Field Of The Invention

This invention relates broadly to method and apparatus for collecting gases formed during operation of a steel furnace. More specifically, this invention relates to method and apparatus for collecting gases formed during operation of a steel furnace and conducting said collected gases to gas cleaning equipment, which method and apparatus are designed to maintain a negative static pressure in the collected gases in the stack.

2. Description Of The Prior Art

Conventionally, the operation of oxygen converters and similar steel furnaces involves a melt purification step in which oxygen or oxygen-enriched air is injected into the converter or furnaces through a lance. The resulting off-gases, emanating from the converter or furnace, consist predominantly of carbon monoxide together with entrained solid particles such as iron oxide, and exit through an upper outlet or mouth of the converter or furnace. These off-gases, containing highly poisonous carbon monoxide as well as entrained solid matter, would pollute the atmosphere if allowed to escape directly from the mouth of the converter or furnace, and therefore the off-gases must be cleaned and treated to remove these pollutants. Consequently, means are provided to collect off-gases issuing from the mouth of the converter or furnace and to conduct such off-gases to the appropriate gas cleaning and treating equipment. Such means comprise a gas hood surrounding the mouth of the converter or furnace, the said gas hood not being conveniently attachable around the mouth through a gas-tight seal due to basic process considerations, since the converter or furnace must be tilted after the oxygen purification step to discharge the purified molten steel, as shown, for example, in my prior U.S. Pat. No. 3,186,831. Rather, a spacing is generally provided between the hood and the mouth of the converter or furnace in order to permit entry of air into the hood to cool the inner surface of the hood, to aid in ventilation, and to oxidize part of the carbon monoxide in the off-gases to carbon dioxide.

The system for cleaning off-gases collected in the hood cannot conveniently be located in close proximity to the converter or furnace, because the area immediately adjacent thereto is needed for auxiliary operating equipment which must be located close to the converter or furnace. Such auxiliary operating equipment may, for example, include the lance hoist for raising and lowering the oxygen lance, conveyors, hoppers and the like. Therefore, the gas cleaning system is usually remotely located relative to the converter or furnace, and a long conduit communicates between the upper portion of the hood and the gas cleaning system, the said long conduit including an initial vertical portion or stack rising directly from the top of the hood to a convenient elevation to clear the auxiliary operating equipment and the area immediately surrounding the converter or furnace, and then taking a horizontal tack out of the immediate area. Conventionally, the hood and vertical stack are of water-cooled panel construction, i.e., the hood and vertical stack are constructed in sections and in each section an annular passage is provided between an inner metallic plating and an outer metallic plating and water is circulated in the annular passage to cool the inner metallic plating. In such conventional apparatus, no account is taken of the fact that, due to what is known as stack effect, the static pressure of the collected gases, which may initially have had a negative value in the hood, increases and acquires a positive value in the stack and thus would tend to leak out into the atmosphere through the joints between adjacent panels, creating undesirable and intolerable conditions in the working areas adjacent the converter or furnace. Moreover, as the temperature of the off-gases may run 4,500° F., the cooling water requirements of a typical basic oxygen furnace (known in the industry as BOF) hood and stack are truly phenomenal, lying in the range of 6,000 to 12,000 gallons per minute.

SUMMARY OF THE INVENTION

One of the objects of this invention is to provide improved method and apparatus for collecting gases formed during operation of a steel furnace.

Another of the objects of this invention is to provide improved method and apparatus for collecting gases formed during operation of a steel furnace and conducting said collected gases to gas cleaning equipment.

A further object of this invention is to provide improved method and apparatus for preventing leakage of gases collected from the mouth of a steel furnace through the joints between adjacent sections of a panel-constructed stack.

Still another object of this invention is to provide improved method and apparatus for reducing the stack cooling water requirements of a steel furnace.

Yet another object of this invention is to provide method and apparatus for more efficiently cooling furnace off-gases.

Other and further objects of this invention will become apparent during the course of the following description and by reference to the accompanying drawing and the appended claims.

Briefly, I have discovered that the foregoing objects may be attained by so proportioning the stack that a negative static pressure is maintained throughout said stack. Alternatively, an orifice may be placed in the bottom of the stack to maintain a negative static pressure throughout the stack. Further, the inner metallic plating of the stack may be provided with a ceramic coating or lining to decrease the coefficient of heat transfer between the hot collected off-gases and the cooling water in the annular passage between the inner and outer metallic platings of the stack.

BRIEF DESCRIPTION OF THE DRAWING

Referring now to the drawing in which like numerals represent like parts in the several views:

FIG. 1 represents a view in elevation, partially broken away, of a prior art structure.

FIG. 2 represents a view in elevation, partially broken away, of the improved structure of the present invention.

FIG. 3 represents a horizontal cross-section taken along the line 3—3 of FIG. 2.

FIG. 4 represents a fragmentary view in elevation, partially broken away, showing a modified form of the present invention.

DESCRIPTION OF THE PREFERRED EMBODIMENT

A conventional structure is shown in FIG. 1, and comprises hood 1 mounted over mouth 2 of steel furnace or converter 3, stack 4 surmounting hood 1 and extending upwardly therefrom. Stack 4 is provided with relief cap 5 at its upper end, and a horizontal conduit 6 communicates between the upper portion of stack 4 and a conventional gas cleaning system (not shown).

Steel furnace or converter 3 may be of the type now gaining favor in the industry, viz., the basic oxygen converter (abbreviated BOF), and, as shown, is provided with the well-known oxygen lance 7 extending through a sleeve 8 in the hood 1.

The hood 1 may be of panel construction, each panel 9 having an inner metallic plating 10 and an outer metallic plating 11, the space between inner and outer metallic platings 10 and 11, respectively, of each panel 9 accommodating a circulating body of cooling water in the known manner.

Similarly, the stack 4 is of panel construction, each panel 12 having an inner metallic plating 13 and an outer metallic plating 14, the space between inner and outer metallic platings 13 and 14, respectively, of each panel 12 accommodating a circulating body of cooling water in the known manner.

The function of the cooling water in panels 9 and 12 is to cool the inner metallic platings 10 and 13, respectively. The temperatures of the off-gases from furnace or converter 3 are quite high, approximately 4,500° F., and the quantities of water required for cooling purposes are tremendous, ranging between 6,000 and 12,000 gallons per minute.

In the operation of the conventional structure shown in FIG. 1, a slight negative pressure is created at the mouth or bottom of hood 1, due to the suction of the fan in the gas cleaning system (not shown). This slight negative pressure draws into the hood 1 off-gases from the furnace or converter 3 as well as air from the atmosphere, as indicated diagrammatically by the arrows in FIG. 1. As the mixture of air and off-gases proceeds upwardly through the hood 1 and stack 4, the static pressure within the stack 4 increases due to what is known as the natural draft effect. Therefore, in the upper portion of the stack 4, the static pressure acquires a positive value which may cause a substantial amount of leakage of the mixture of air and off-gases through the joints between adjacent panels 12. This leakage is most undesirable, inasmuch as carbon monoxide and iron oxide fumes are substantial components of the leaking gases and the area in the immediate vicinity of stack 4 is a working area containing conveyors, bins or hoppers for various materials used in the process, and other equipment.

In FIG. 2, the present invention is seen as comprising a vertical conduit 15, generally of somewhat smaller cross-section than the cross-section of the conventional stack 4, the said vertical conduit 15 communicating between the upper end of tapered hood 16 and a horizontal conduit 17, the latter being provided with relief cap 18 and leading to a gas cleaning system (not shown). It will be understood that vertical conduit 15 rises above all of the equipment associated with the operation of furnace or converter 3 before connecting with the horizontal conduit 17. Hood 16 may be of panel construction, each panel 19 having an inner metallic plating 20 and an outer metallic plating 21, the space between inner and outer metallic platings 20 and 21, respectively, of each panel 19 accommodating a circulating body of cooling water in the known manner. Similarly, the vertical conduit 15 is of panel construction, each panel 22 having an inner metallic plating 23 and an outer metallic plating 24, the spaces between inner and outer metallic platings 23 and 24, respectively, of each panel 22 accommodating a circulating body of cooling water in the known manner.

The cross-sectional area of vertical conduit 15, within inner metallic plating 23, is chosen with a view to the quantity and temperature of off-gases collected by hood 16 from the mouth of the furnace or converter 3, so that the static pressure of the off-gases as they proceed upwardly through the said vertical conduit 15 is always negative. Thus, if any leakage can occur through the joints between adjacent panels 19, the leakage will be inwardly, atmospheric air leaking into the vertical conduit 15, rather than outwardly, off-gases leaking from the vertical conduit 15, the former condition being tolerable, the latter condition being intolerable.

The desired condition of negative static pressure and preferential inward leakage is achieved by sufficiently increasing the velocity of the off-gases in a properly proportioned vertical conduit 15. By fixing the cross-sectional area of vertical conduit 15 at a proper value (in light of the anticipated quantity and temperature of off-gases entering the mouth of hood 16), the off-gases will be accelerated to such a velocity that the static pressure of these accelerated gases will be negative, and by properly proportioning the stack or conduit 15 throughout its length, the initially negative static pressure of the accelerated off-gases will remain negative throughout the stack or vertical conduit 15.

More specifically, it has been found that, optimally, conduit 15 should be so proportioned that the relationship between horizontal cross-sectional area at the base of the conduit 15 and at a point above the base of the conduit 15 is governed by the following formula:

$$A = A_1 \sqrt{h_1/h}$$

where:

$A$ is the cross-sectional area, in square feet, of the conduit 15 at a point above the base of the said conduit 15;

$A_1$ is the cross-sectional area, in square feet, of the conduit 15 at its base;

$h$ is the elevation, in feet, of the point at which the cross-sectional area, A, is to be determined, above the bottom of the hood 16;

$h_1$ is the elevation, in feet, of the base of the conduit 15, above the bottom of the hood 16.

When the conduit 15 is of circular cross-section, the formula may be expressed in terms of diameters as follows:

$$D = D_1 \sqrt[4]{h_1/h}$$

where:

$D$ is the diameter, in feet, of the conduit 15 at a point above the base of the said conduit 15;

$D_1$ is the diameter, in feet, of the conduit 15 at its base;

$h$ is the elevation, in feet, of the point at which the diameter, D, is to be determined, above the bottom of the hood 16;

$h_1$ is the elevation, in feet, of the base of the conduit 15, above the bottom of hood 16.

The foregoing formulas, when applied to a regularly tapered conduit 15, and specifically to a conduit 15 of circular cross section, are believed to describe a converging (as one proceeds upwardly) approximately parabolic vertical cross-section and the cross-section of conduit 15 has been so described herein.

In a typical example of a circuit conduit 15 surmounting a 30 foot high hood 16, diameters of conduit 15 at several points along its height are optimally as follows:

| Height above bottom of hood 16 (feet) | Diameter (feet) |
|---|---|
| 30 (bottom of conduit) | 12 |
| 40 | 11.2 |
| 50 | 10.6 |
| 60 | 10.1 |
| 70 | 9.75 |
| 80 | 9.44 |
| 90 | 9.1 |
| 120 | 8.5 |

As hereinbefore mentioned, it is the static pressure, rather than velocity pressure, which determines in which direction leakage will occur through the joints between adjacent panels 19 of the vertical conduit 15, and such leakage in the present invention outwardly from the interior of vertical conduit 15 cannot occur, any leakage between joints of adjacent panels 19 being inwardly from the atmosphere, an acceptable alternative to an intolerable condition.

An additional advantage residing in the present invention is that the area immediately surrounding the furnace or converter 3 will be cleaner, because more of the slag particles and debris will be carried up vertical conduit 15 due to the high velocity of the off-gases therein.

It will be noted that, unlike the conventional apparatus which employs a relief cap 5 at the top of stack 4, in the present invention relief cap 18 is offset from vertical conduit 15, being located in horizontal conduit 17. This feature prevents the velocity pressure of the off-gases from directly impinging on the underside of relief cap 18 and thereby prevents the velocity pressure of these off-gases from creating a positive pressure at the relief cap 18 to cause leakage of said gases to the atmosphere. Rather, in the present arrangement, the relief cap 18 will be in an area of negative pressure and leakage, if any, would be inwardly from the atmospheres, an acceptable condition.

As hereinbefore mentioned, the cooling water requirements of conventional BOF apparatus are enormous. It has been discovered that, as distinguished from the conventional cooling of off-gases with cooling water circulated in the panels 9 and 12 of the conventional hood 1 and stack 13, such cooling is more economically handled in the gas cleaning system, particularly where a wet gas cleaning system with a quencher and gas cooling tower are employed. To reduce the cooling water requirements, therefore, inner metallic platings 20 and 23 of the hood 16 and vertical conduit 15, respectively, are coated with a ceramic insulating material 25 (firebrick, etc.). The ceramic 25 reduces heat transfer through the inner metallic platings 20 and 23, and only enough cooling water is required to be circulated through panels 19 and 22 to prevent ceramic 25 from melting. Such amount of cooling water is a very small fraction of the conventional cooling water requirements.

A modification of the present invention is shown in FIG. 4. Here, a conventionally sized stack 4, communicating with the upper end of hood 1, is provided at its lower end with an orifice plate 26 having an aperture 27 therethrough. Orifice plate 26 will accelerate off-gases to reduce the static pressure thereof to such a negative level that these off-gases will retain a negative static pressure at the upper end of stack 4, whereby leakage, if any, through the joints between adjacent panels 12 will preferentially be inwardly, atmospheric air entering stack 4, rather than outwardly, off-gases from within the stack 4 entering the atmosphere.

I claim:

1. Method of collecting gases produced in a furnace having a mouth and conducting said gases towards a gas cleaning system, said method comprising:
   a. collecting gases issuing from the mouth of the furnace,
   b. accelerating said gases in a confined vertical path having a cross-section decreasing upwardly throughout the entire height of said vertical path, said path leading towards a gas cleaning system, to such a velocity as to maintain the static pressure of said collected gases at a negative value throughout said confined path,
   c. whereby to prevent leakage of said collected gases from said confined path to the atmosphere.

2. Method as in claim 1, further comprising:
   d. said gases being accelerated in said confined vertical path after collection from the mouth of the furnace to a height sufficient to clear auxiliary equipment located in the vicinity of the furnace.

* * * * *

UNITED STATES PATENT OFFICE
CERTIFICATE OF CORRECTION

Patent No. 3,785,630           Dated January 15, 1974

Inventor(s) Daniel E. Pike

It is certified that error appears in the above-identified patent and that said Letters Patent are hereby corrected as shown below:

Column 5, line 9, "circuit" should read "circular".

Column 5, line 48, "atmospheres" should read "atmosphere".

Signed and sealed this 23rd day of April 1974.

(SEAL)
Attest:

EDWARD M. FLETCHER, JR.
Attesting Officer

C. MARSHALL DANN
Commissioner of Patents